(12) United States Patent
Popovich et al.

(10) Patent No.: US 10,831,297 B2
(45) Date of Patent: Nov. 10, 2020

(54) METHOD, APPARATUS AND COMPUTER-READABLE MEDIA FOR TOUCH AND SPEECH INTERFACE

(71) Applicant: Nureva, Inc., Calgary (CA)

(72) Inventors: David Popovich, Ottawa (CA); David Douglas Springgay, Ottawa (CA); David Frederick Gurnsey, Ottawa (CA)

(73) Assignee: NUREVA INC. (CA)

( * ) Notice: Subject to any disclaimer, the term of this patent is extended or adjusted under 35 U.S.C. 154(b) by 0 days.

(21) Appl. No.: 16/541,261

(22) Filed: Aug. 15, 2019

(65) Prior Publication Data

US 2020/0033981 A1 Jan. 30, 2020

Related U.S. Application Data

(63) Continuation of application No. 15/614,988, filed on Jun. 6, 2017, now Pat. No. 10,394,358.
(Continued)

(51) Int. Cl.
*G06F 3/041* (2006.01)
*G10L 15/22* (2006.01)
(Continued)

(52) U.S. Cl.
CPC ............ *G06F 3/0412* (2013.01); *G06F 3/038* (2013.01); *G06F 3/0416* (2013.01); *G10L 15/22* (2013.01);
(Continued)

(58) Field of Classification Search
None
See application file for complete search history.

(56) References Cited

U.S. PATENT DOCUMENTS

| 4,499,578 A | 2/1985 | Marouf et al. |
| 5,337,363 A | 8/1994 | Platt |

(Continued)

FOREIGN PATENT DOCUMENTS

| CA | 2499033 A1 | 9/2005 |
| DE | 102014012158 A1 | 12/2015 |

(Continued)

OTHER PUBLICATIONS

U.S. Appl. No. 62/346,263, filed Jun. 6, 2016.
(Continued)

*Primary Examiner* — Nicholas J Lee
(74) *Attorney, Agent, or Firm* — Katten Muchin Rosenman LLP (57) ABSTRACT

Method, apparatus, and computer-readable media for touch and speech interface includes structure and/or function whereby at least one processor: (i) receives an input from a touch sensitive input device; (ii) establishes a touch speech time window with respect to the received touch input; (iv) receives an input from a speech input device; (v) determines whether the received speech input is present in a global dictionary; (vi) if the received speech input is present in the global dictionary, determines whether the received speech input has been received within the established touch speech time window; and (vii) if the received speech input has been received within the established touch speech time window, activate an action corresponding to both the received touch input and the received speech input.

19 Claims, 10 Drawing Sheets

Related U.S. Application Data (60) Provisional application No. 62/346,263, filed on Jun. 6, 2016.

(51) Int. Cl.
 *G06F 3/038* (2013.01)
 *G10L 15/26* (2006.01)

(52) U.S. Cl.
 CPC .... *G10L 15/265* (2013.01); *G06F 2203/0381* (2013.01); *G10L 2015/223* (2013.01)

(56) References Cited

U.S. PATENT DOCUMENTS

| | | | |
|---|---|---|---|
| 5,477,270 | A | 12/1995 | Park |
| 6,624,841 | B1 | 9/2003 | Buchner et al. |
| 6,912,718 | B1 | 6/2005 | Chang et al. |
| 6,961,439 | B2 | 11/2005 | Ballas |
| 7,058,168 | B1 | 6/2006 | Knappe et al. |
| 7,130,705 | B2 | 10/2006 | Amir et al. |
| 7,177,413 | B2 | 2/2007 | O'Toole |
| 7,533,346 | B2 | 5/2009 | McGrath et al. |
| 7,720,212 | B1 | 5/2010 | Jouppi et al. |
| 7,848,531 | B1 | 12/2010 | Vickers et al. |
| 8,014,884 | B2 | 9/2011 | Kindo et al. |
| 8,073,125 | B2 | 12/2011 | Zhang et al. |
| 8,185,387 | B1 | 5/2012 | Lachapelle |
| 8,363,810 | B2 | 1/2013 | Yoakum et al. |
| 8,462,190 | B2 | 6/2013 | Togami et al. |
| 8,958,569 | B2 | 2/2015 | Bar-Zeev et al. |
| 9,823,893 | B2 | 11/2017 | Bhat et al. |
| 2002/0064149 | A1 | 5/2002 | Elliott et al. |
| 2002/0077830 | A1 | 6/2002 | Suomela et al. |
| 2004/0013252 | A1 | 1/2004 | Craner |
| 2004/0257432 | A1 | 12/2004 | Girish et al. |
| 2008/0085014 | A1 | 4/2008 | Chen et al. |
| 2009/0238378 | A1 | 9/2009 | Kikinis |
| 2010/0070281 | A1 | 3/2010 | Conkie et al. |
| 2010/0135118 | A1 | 6/2010 | Van Leest |
| 2010/0312547 | A1 | 12/2010 | Van Os et al. |
| 2011/0022393 | A1 | 1/2011 | Waller et al. |
| 2011/0074693 | A1 | 3/2011 | Ranford et al. |
| 2012/0121076 | A1 | 5/2012 | Yoakum |
| 2013/0101134 | A1 | 4/2013 | Betts-Lacroix |
| 2013/0144629 | A1 | 6/2013 | Johnston et al. |
| 2013/0257780 | A1 | 10/2013 | Baron |
| 2014/0078075 | A1 | 3/2014 | Wilensky et al. |
| 2014/0119552 | A1 | 5/2014 | Beaucoup |
| 2014/0222436 | A1 | 8/2014 | Binder et al. |
| 2015/0382127 | A1 | 12/2015 | Sun et al. |
| 2016/0006879 | A1 | 1/2016 | Dickinns et al. |
| 2016/0026253 | A1 | 1/2016 | Bradski |
| 2016/0026434 | A1 | 1/2016 | Johnston et al. |
| 2016/0075016 | A1 | 3/2016 | Laurent et al. |
| 2016/0103655 | A1 | 4/2016 | Klein |
| 2016/0124706 | A1 | 5/2016 | Vasilieff et al. |
| 2016/0232108 | A1 | 8/2016 | Goss |
| 2016/0234019 | A1 | 8/2016 | Goss |
| 2016/0283455 | A1 | 9/2016 | Mardanbegi |
| 2017/0061138 | A1 | 3/2017 | Lambert |
| 2019/0094981 | A1 | 3/2019 | Bradski |

FOREIGN PATENT DOCUMENTS

| | | |
|---|---|---|
| EP | 0 479 604 A2 | 4/1992 |
| EP | 2 063 419 A1 | 5/2009 |
| WO | 1992/009921 A1 | 6/1992 |
| WO | 97/33450 A1 | 9/1997 |
| WO | 2009/117450 A1 | 9/2009 |
| WO | 2016/197257 A1 | 12/2016 |

OTHER PUBLICATIONS

Transmittal; International Search Report; and Written Opinion of the International Searching Authority for International Application No. PCT/CA2017/050691.

Written Opinion of the International Examining Authority for International Application No. PCT/CA2017/050690, dated Apr. 26, 2018.

Extended European Search Report for European Patent Application No. 17809497.5 dated May 7, 2019.

Joseph Hector Dibiase, Thesis entitled, "A High-Accuracy, Low-Latency Technique for Talker Localization in Reverberant Environments Using Microphone Arrays", Brown University, May 2000.

Transmittal; International Search Report; and Written Opinion of the International Searching Authority for International Application No. PCT/CA2017/050672 dated Oct. 10, 2017.

International Preliminary Report on Patentability for International Application No. PCT/CA2017/050690, dated Aug. 13, 2018.

Transmittal; International Search Report; and the Written Opinion of the International Searching Authority for International Application No. PCT/CA2017/050690, dated Sep. 25, 2017.

Non-Final Rejection dated Sep. 6, 2019, from U.S. Appl. No. 16/426,472, 16 sheets.

Final Rejection dated Jan. 10, 2020, from U.S. Appl. No. 16/426,472, 34 sheets.

Final Rejection dated Nov. 19, 2018, from U.S. Appl. No. 15/614,988 , 26 sheets.

Non-Final Rejection dated Apr. 25, 2018, from U.S. Appl. No. 15/614,988 , 15 sheets.

Notice of Allowance dated Jul. 22, 2020, from U.S. Appl. No. 16/426,472, 36 sheets.

Fig 1a.

Fig 2. Example for Speech interface

Fig 3a. Example for Touch Speech Interface

Fig 3b. Example for Touch Speech Interface

Fig 4. Touch context timespan (Touch speech time window)

Fig 5a. Touch example with multiple touches to create action

| Touching on | Next selection | Selecting option | Action | Next Effort |
|---|---|---|---|---|
| Note | Selecting menu | Blue | Turns note Blue | three touches |
|  | Selecting menu | Green | Turns note Green | three touches |
|  | Selecting menu | Pink | Turns note Pink | three touches |
|  | Selecting menu | Yellow | Turns note Yellow | three touches |
|  | Selecting menu | Edit | Takes Sketch into edit mode | three touches |
|  | Selecting menu | Delete | Deletes note | three touches |
|  | Selecting menu | Duplicate | Duplicates note | three touches |
| Sketch | Selecting menu | Edit | Takes Sketch into edit mode | three touches |
|  | Selecting menu | Duplicate | Duplicates Sketch | three touches |
|  | Selecting menu | Delete | Deletes Sketch | three touches |
| Flipchart | Selecting menu | Delete | Deletes Flipchart | three touches |
|  | Selecting menu | Edit | Takes Flipchart into edit mode | three touches |
|  | Selecting menu | Duplicate | Duplicates Flipchart | three touches |
| Group | Selecting menu | Delete | Deletes Group | three touches |
|  | Selecting menu | Edit | Takes Group into edit mode | three touches |
|  | Selecting menu | Duplicate | Duplicates Group | three touches |
| Canvas (Dwell touch) | Selecting menu | New Note | Creates new note, in location touched | three touches |
|  | Selecting menu | New Sketch | Creates new Sketch, in location touched | three touches |
|  | Selecting menu | New Group | Creates new Group, in locations touched | three touches |
|  | Selecting menu | New Flipchart | Creates new flipchart, in location touched | three touches |
|  | Selecting menu | Close | Closes the Canvas | three touches |

Fig 5b. Speech example with multiple words to create action

| Wake word | First phrase | Second phrase | Action | Further user action | Net Effort |
|---|---|---|---|---|---|
| "System" | "Select the note that says 'Product Category'" | "Change to blue" | Turns note Blue | | 11 spoken words |
| "System" | "Create new note" | | Creates new Sketch, in generic location | User must now move note to desired location | 4 spoken words plus further interaction required |
| "System" | "Create new note" | "In quadrant A 2" | Creates new Sketch, in location "A2" | | 8 spoken words |

Fig 5C. Touch speech example of single touch with simple command to create action

| Touching on | Saying command | Action | Net effort |
|---|---|---|---|
| Note | Blue | Turns note Blue | One touch, one spoken word |
| | Green | Turns note Green | One touch, one spoken word |
| | Pink | Turns note Pink | One touch, one spoken word |
| | Yellow | Turns note Yellow | One touch, one spoken word |
| | Delete | Deletes note | One touch, one spoken word |
| | Edit | Takes note into edit mode | One touch, one spoken word |
| | Duplicate | Duplicates note | One touch, one spoken word |
| Sketch | Delete | Deletes Sketch | One touch, one spoken word |
| | Edit | Takes Sketch into edit mode | One touch, one spoken word |
| | Duplicate | Duplicates Sketch | One touch, one spoken word |
| Flipchart | Delete | Deletes Flipchart | One touch, one spoken word |
| | Edit | Takes Flipchart into edit mode | One touch, one spoken word |
| | Duplicate | Duplicates Flipchart | One touch, one spoken word |
| Group | Delete | Deletes Group | One touch, one spoken word |
| | Edit | Takes Group into edit mode | One touch, one spoken word |
| | Duplicate | Duplicates Group | One touch, one spoken word |
| Canvas | New Note, create note, create a new note | Creates new note, in location touched | One touch, two spoken words |
| | New Sketch, create sketch, create a new sketch | Creates new Sketch, in location touched | One touch, two spoken words |
| | New Group, create group, create a new group | Creates new Group, in location touched | One touch, two spoken words |
| | New Flipchart, create flipchart, create a new flipchart | Creates new flipchart, in location touched | One touch, two spoken words |
| | Close | Closes the canvas | One touch, one spoken word |

METHOD, APPARATUS AND COMPUTER-READABLE MEDIA FOR TOUCH AND SPEECH INTERFACE

This application is a continuation of U.S. patent application Ser. No. 15/614,988, filed Jun. 6, 2017 now U.S. Pat. No. 10,394,358 issued Aug. 27, 2019, which claims priority to U.S. Provisional Patent Application No. 62/346,263, filed Jun. 6, 2016, the entire contents of all incorporated herein by reference.

TECHNICAL FIELD OF THE INVENTION

The present invention generally relates to methods and systems for simplifying and optimizing user interaction workflows relating to utilizing interactive displays by optimizing speech and touch inputs to reduce the number of words that a user must speak, and touch events to perform a specific action by leveraging touch and speech information from the time of the interaction event and the context of what was touched and the touch speech window.

BACKGROUND

Speech recognition in the current art is utilized as an input for computational and electronic devices to free the use of hands so that keyboards and other input devices are not necessarily required. Speech as an input modality has been increasing in popularity and is often deployed in electronic devices to reduce the amount of keyboard, mouse or touch events required to perform an action. In many cases, the ability to use speech as an input greatly simplifies the amount of alternate input; an example would be speaking a search query instead of typing it. In other cases, the amount of speech required to perform an action is long and users do not like interacting with computational and electronic devices in this way. An example would be stringing multiple commands together by voice command by asking the system to select a specific object and perform an action with it or to create something and tell the system where to create it.

The problems with managing and efficiently handling multiple modalities of user inputs into devices and systems increases significantly when a user is managing complex multiple object types and menu and/or command hierarchies while interacting with complex systems that may contain large interactive displays, multi-user inputs, and busy collaborative environments.

Traditionally, methods in the prior art utilize a wake word such as used in auto-assistants and computer driven voice command systems. The utilization of a wake word to is to create a waking trigger event to capture and then act on the audio dialog that follows the wake word by parsing and identifying commands that are relevant to the device. The use of a "wake word" to trigger the start of the speech recognition adds an additional word to speak that is not relevant to the actions required which adds overhead to the interactive workflow the user wants to accomplish.

Speech input also has limitations when it comes to additional context for a command. A user might use speech to invoke a command, but what the command should be applied to, or where the end result should be, is either not present or the system needs to have additional input to properly satisfy the intent of the user.

Touch events for computers and or command based systems such as in vehicle GPS and audio systems require a touch event to tell the device that it should be expecting either further touch commands and or voice commands. In speech deployments where physical buttons or software interface buttons are used to initiate the ASR, this type of trigger does not lend itself to large displays or to multitasking environments due to the difficulty in reaching for them when interacting with large interactive surfaces and do not permit a trigger to be anywhere on the graphical user interface. The systems in the prior art typically have preassigned touch buttons to trigger the touch speech interaction which limits the flexibility to allow touch speech interactions in dynamic graphical and multitasking environments.

A draw back that may be present in both scenarios is that a triggering event is needed, which wakes the device to listen, then initialize and then look for the commands, which reduces the utility and efficiency of the devices in the prior art to handle and anticipate complex multimodal commands that happen in dynamic environments, with single or multiple users of complex interactive systems.

Patent Application No. US20020077830 A1 describes a process for activating speech recognition in a terminal, and includes automatically activating speech recognition when the terminal is used, and turning the speech recognition off after a time period has elapsed after activation. The process also takes the context of the terminal into account when the terminal is activated and defines a subset of allowable voice commands which correspond to the current context of the device.

Patent Application No. US20100312547 A1 describes techniques and systems for implementing contextual voice commands. On a device, a data item in a first context is displayed. On the device, a physical input (selecting the displayed data item in the first context) is received. On the device, a voice input that relates the selected data item to an operation in a second context is received. The operation is performed on the selected data item in the second context.

Patent Application No. US20140222436 A1 discloses a method for operating a voice trigger. In some implementations, the method is performed at an electronic device including one or more processors and memory storing instructions for execution by the one or more processors. The method includes receiving a sound input. The sound input may correspond to a spoken word or phrase, or a portion thereof. The method includes determining whether at least a portion of the sound input corresponds to a predetermined type of sound, such as a human voice. The method includes, upon a determination that at least a portion of the sound input corresponds to the predetermined type, determining whether the sound input includes predetermined content, such as a predetermined trigger word or phrase.

The present invention is intended to overcome one or more of the problems discussed above.

SUMMARY OF THE INVENTION

The present invention provides systems and methods for optimizing a plurality of interaction workflows on single or multiuser interactive displays, utilizing touch and speech modalities by combining touch events with a speech window to recognize input. Preferably the touch speech time window comprises a pre-touch window, a touch window, and a post touch window. A speaker pronounces a word (e.g., "blue") within the touch speech time window of touching an object on the display, thus turning the touched object blue on the display. A global dictionary is used to recognize the word and thus flexibly combines speech and touch contexts to optimize the user's workflow to manage objects, applications, windows and functions on electronic devices and computers.

The present invention allows users to utilize multiple modalities to interface with objects in single and multiusers systems. By eliminating the need for a wake word or a specific triggering pre-touch event the system is able to react to dynamic user driven context situations and minimize the amount of user interaction while optimizing the command hierarchy and interaction to the most efficient modality at the time of interaction. Preferably utilizing a touch context time window method, the present invention is able to utilize a time window before the touch event, a time window during the touch event, and a post touch event window. This system provides similar improvements to other voice command and touch systems, but with the advantage of not needing to be triggered first before the audio stream can be parsed and analyzed for voice driven menu commands, resulting in a more efficient user experience and less overhead required to execute the commands. Because the system is actively listening for commands to apply to a dynamic touch context situation, the system is able to adapt by applying specific command functions appropriate to the touch context in a less structured sequence allowing for more flexible user interaction possibilities.

According to one aspect of the present invention, a touch and speech interface includes using a system with both a microphone input and an interactive touch interface to form a multimodal interface to the system. The microphone is preferably connected to an Automatic Speech Recognition ("ASR") system that references a global dictionary that identifies key words in an active touch speech time window which is passed to the Touch Speech Interface system. The application program monitors touch events and captures the object and context data which is passed to the Touch Speech Interface system. This aspect of the invention can preferably utilize both the microphone captured content and the touch event captured content asynchronously, as both are passed independently to the Touch Speech Interface device. This allows the system the ability to associate pre-touch, current touch, and post touch voice commands to the touch object thus optimizing the work flow and minimizing rigid menu command hierarchical layers. The menu command structure applied to an object is preferably not limited to specific pre-triggering events such as a wake word. The object type and context determines the version of a dictionary from the plurality of available dictionaries, allowing for flexible voice and touch interactive command workflows that adapt in real-time to the user's needs on a per target object basis.

Because the Touch Speech Interface is preferably active all the time, utilizing the touch speech time window method and not requiring a wake-up event, the system can respond dynamically to touch voice combinations and optimize the user's interactive experience. The user can say "Blue" then touch an object, or the user can touch the object and then say "Blue." Because both events are within a predefined context and touch speech time window, the Touch Speech Interface system turns the touched object "Blue". In this example, no wake word is utilized and no specific selected menu touch event was executed. The Touch Speech system interface was able to associate the ASR parsed words from the touch speech time window to the Global Dictionary to the appropriate object context, and execute the command on the user identified object.

When users interact with the computer via a touch system, it is possible to obtain the time that the touch was initiated along with the object (context) that was touched or selected. By combining the information gained from the touch system with the speech interface that the computer deploys, it is possible to shorten the number of speech events to perform an action.

Because the Touch Speech interface is not limited to specific triggered startup events the most optimized user interactive workflow can be executed without the unnecessary overhead of systems in the current art.

According to another aspect of the present invention, touch and speech input apparatus configured for a user to provide input to a touch sensitive input device and using a speech input device has at least one memory storing a plurality of words in a global dictionary. At least one processor configured to: (i) receive an input from the touch sensitive input device; (ii) establish a touch speech time window with respect to the received input from the touch sensitive input device; (iv) receive an input from the speech input device; (v) determine whether the received input from the speech input device is present in the global dictionary; (vi) if the received input from the speech input device is present in the global dictionary, determine whether the received input from the speech input device has been received within the established touch speech time window; and (vii) if the received input from the speech input device has been received within the established touch speech time window, activate an action corresponding to both the received input from the touch sensitive input device and the received input from the speech input device.

According to a further aspect of the present invention, touch and speech input method for a user to provide input to a touch sensitive input device and using a speech input device includes steps whereby a plurality of words are stored in a global dictionary in at least one memory. At least one processor is used to: (i) receive an input from the touch sensitive input device; (ii) establish a touch speech time window with respect to the received input from the touch sensitive input device; (iv) receive an input from the speech input device; (v) determine whether the received input from the speech input device is present in the global dictionary; (vi) if the received input from the speech input device is present in the global dictionary, determine whether the received input from the speech input device has been received within the established touch speech time window; and (vii) if the received input from the speech input device has been received within the established touch speech time window, activate an action corresponding to both the received input from the touch sensitive input device and the received input from the speech input device.

According to yet another aspect of the present invention, program code embodied in a non-transitory computer readable medium for touch and speech input for a user to provide input to a touch sensitive input device and using a speech input device, said program comprising instructions causing at least one processor to: (i) receive an input from the touch sensitive input device; (ii) establish a touch speech time window with respect to the received input from the touch sensitive input device; (iv) receive an input from the speech input device; (v) determine whether the received input from the speech input device is present in the global dictionary; (vi) if the received input from the speech input device is present in the global dictionary, determine whether the received input from the speech input device has been received within the established touch speech time window; and (vii) if the received input from the speech input device has been received within the established touch speech time window, activate an action corresponding to both the received input from the touch sensitive input device and the received input from the speech input device.

BRIEF DESCRIPTION OF THE DRAWINGS

FIGS. 5 a, b & c are charts depicting the different interaction types and the number of inputs required to invoke an action.

DETAILED DESCRIPTION OF THE PRESENTLY PREFERRED EXEMPLARY EMBODIMENTS

The present invention is directed to systems that utilize multiuser and/or single user interactive surfaces, but is applicable to any computer system or devices that utilizes a touch screen which also has the capability of running an automated speech recognition system for the purpose of executing instructions and or menu commands.

Advantageously, embodiments of the present invention pertain to utilizing a touch speech time window methodology centered around a touch event to provide systems and methods to give users of the system a capability to create, delete and manipulate all properties of the objects on an interactive surface utilizing dynamic voice and touch combinations that optimize the interactive workflow in a single or multiuser environment.

The words computational device, computer and device are used interchangeably and can be construed to mean the same thing.

Figure 1A:
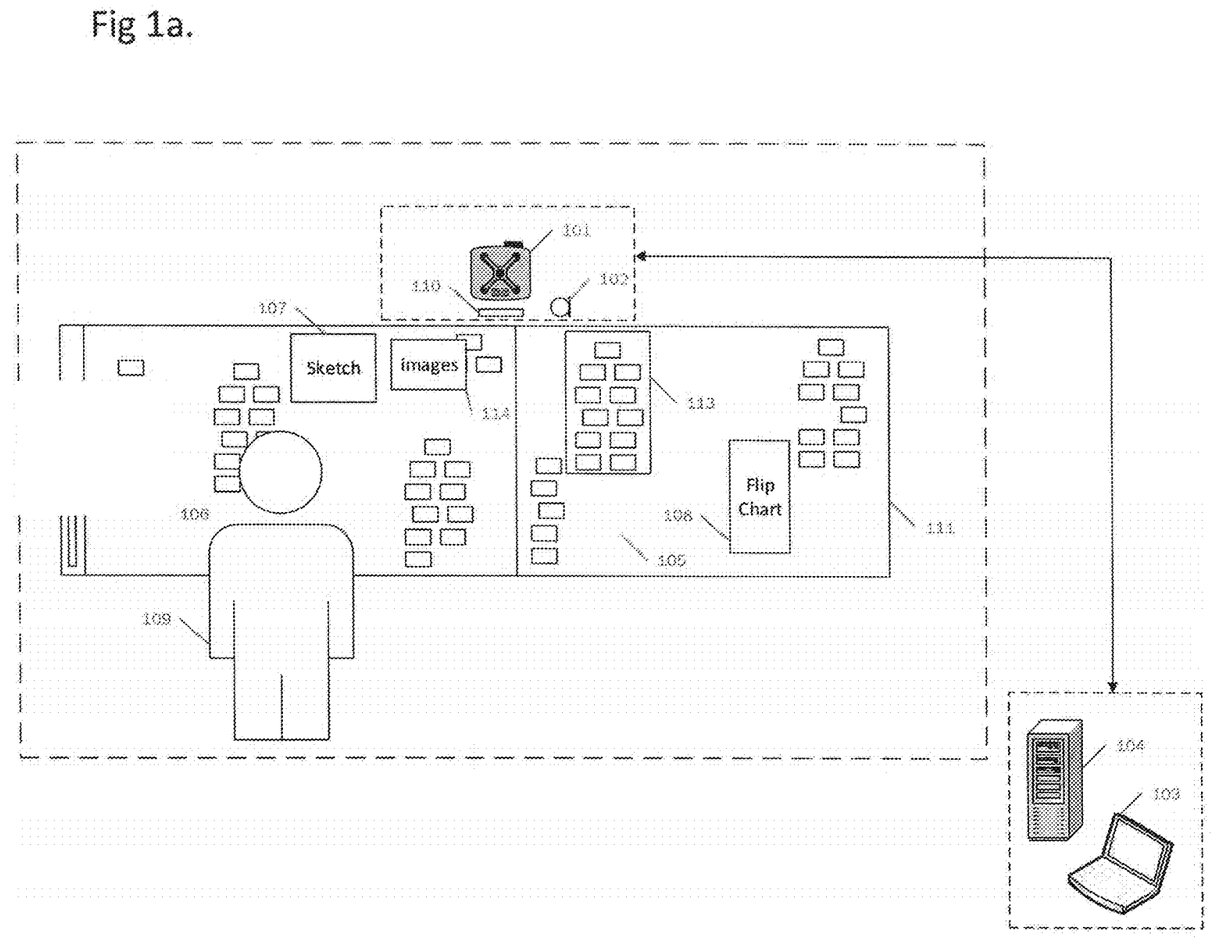
FIGS. 1a & b are illustrations depicting a typical system configuration.
Figure 1B:
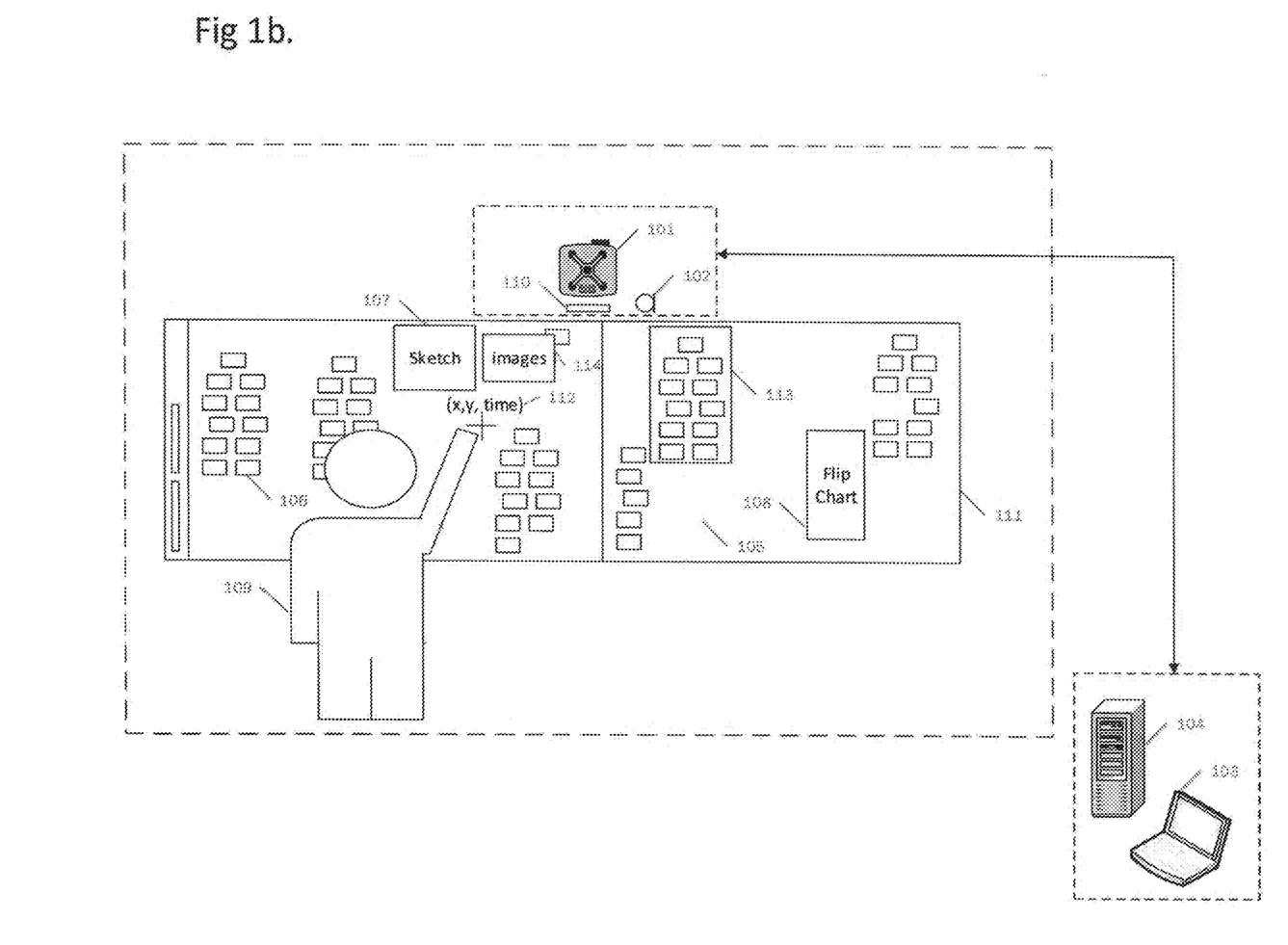

FIGS. 1a and 1b illustrate a system setup that a user might interact with according to an embodiment of the invention. The computational device, or computer, could be any standard PC either desktop 104 or laptop 103 or a smaller device that might have an integrated display and touch screen (Like a tablet). The computer may include one or more processors, a CPU, RAM, storage, video output, audio sound capability and the ability to connect with external peripherals, such as a display, touch system and microphone. Preferably, the computer processor(s) are configured to read program code from one or more computer readable media (such as memory ICs, CDs, DVDs, tape, etc.). The functions described herein may be embodied in software, hardware, firmware, or any combination thereof.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

The computer 103, 104 is shown connected to an interactive projector 101 and the associated touch system 110. The system would not be limited to projection systems and could be any interactive display. A "interactive display" in this specification may include, but is not limited to, one or more of, or any combination of interactive display devices(s) used to receive an interactive event on an interactive display such as, resistive, surface acoustic wave, capacitive, surface capacitance, projected capacitance , mutual capacitance, self-capacitance, use of styli on capacitive screens, infrared grid, optical imaging, dispersive signal technology, acoustic pulse recognition, gesture based controllers, depth aware cameras, wired gloves, stereo cameras, and/or any interactive display device capable of sending/ receiving interactive events and messages to/from a local area network or a wide area network (e.g., the Internet), such as devices embedded in cars, trucks, aircraft, household appliances (refrigerators, stoves, thermostats, lights, electrical control circuits, the Internet of Things, etc.). The computer receives voice input from the user 109 via the connected microphone 102. The user 109 interacts with the graphical user interface 111 with objects—such as, but not limited to, notes 106, sketches 107, flipcharts 108, groups 113, images 114 and the background 105. Although those specific objects are shown, all standard operating system objects such as desktops, files, windows, icons, applications and programs are within the scope of this invention. The user is shown in FIG. 1b to be touching the interactive display 111 and generating a touch event, which may be any convenient touch attribute such as (x, y, time index) coordinates 112 in coordination with a speech event captured through the system microphone 102 which is continually capturing the speech commands to be processed within the active touch speech time window FIG. 4.

Figure 2:
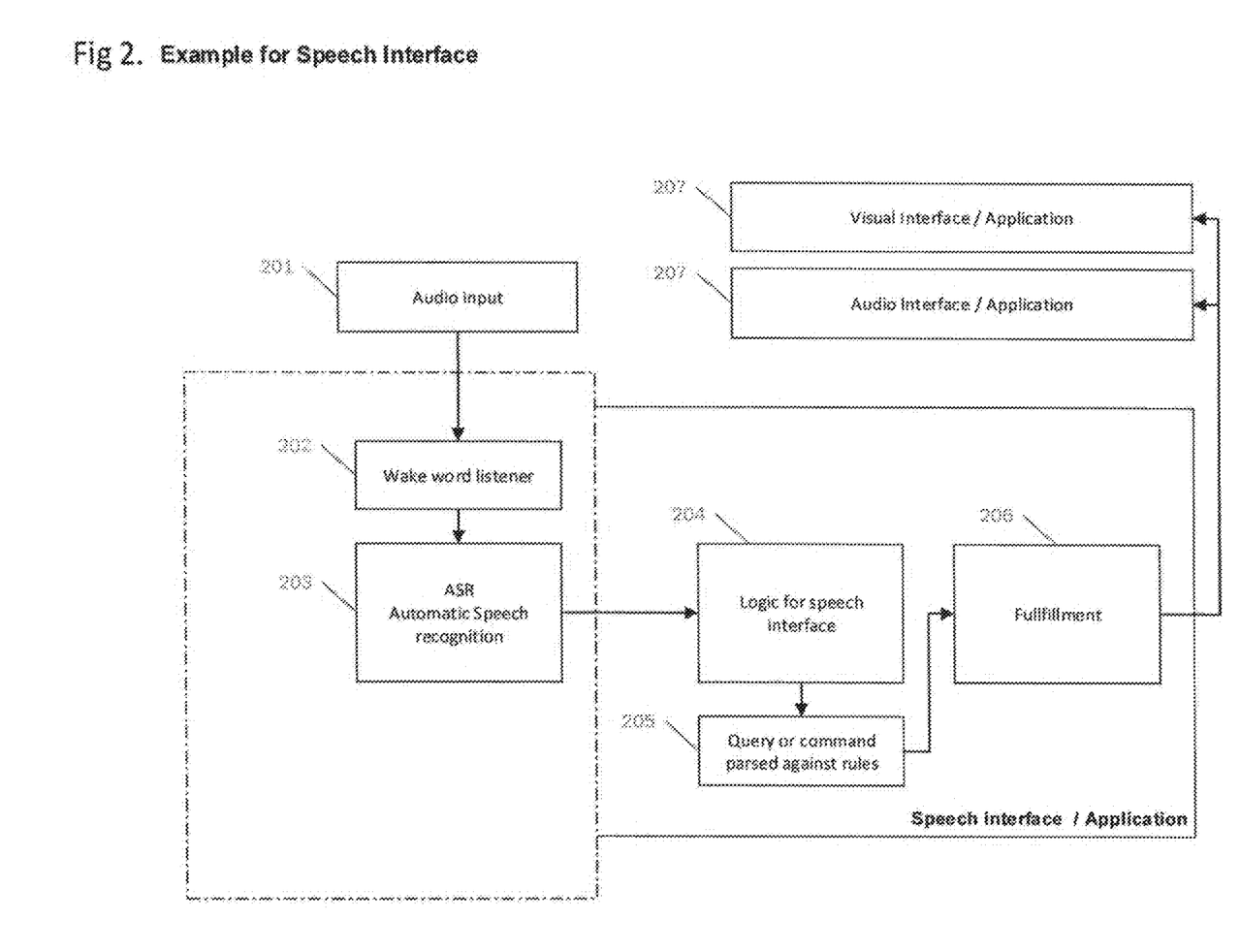
FIG. 2 is a diagrammatic illustration of the architecture for a speech interface that utilizes a wake word.

FIG. 2. depicts a flow chart of a typical speech interface system in the current art that requires a specific wake word for the system to start the ASR (Automatic speech recognition) 203. A microphone (e.g., 102) connected to the computer 103, 104 inputs into the speech interface via audio input 201. The computers described herein may be termed as servers. The wake word listener 202 monitors the input 201 for a match to a specific wake word. The listener and other functionalities described herein may be termed as engines. When the wake word is matched, the ASR 203 is turned on to parse the audio input 201 for speech to text translation. It is important to note that the initialization of the ASR 203 takes time, which may be a second or two, and a user typically needs to wait for a time period after the wake word is spoken to then continue speaking if they want the ASR 203 to receive the spoken words. With the ASR 203 running, the found words are sent to the logic of the speech interface 204 and the logic attempts to match commands or structure from the list of words provided. If a query or command is identified 205, it triggers the fulfillment module 206, which sends appropriate commands to an application program 212, which may or may not have a visual interface 207, and/or it sends appropriate commands to the audio interface 208 for feedback to the user 109.

Figure 3A:
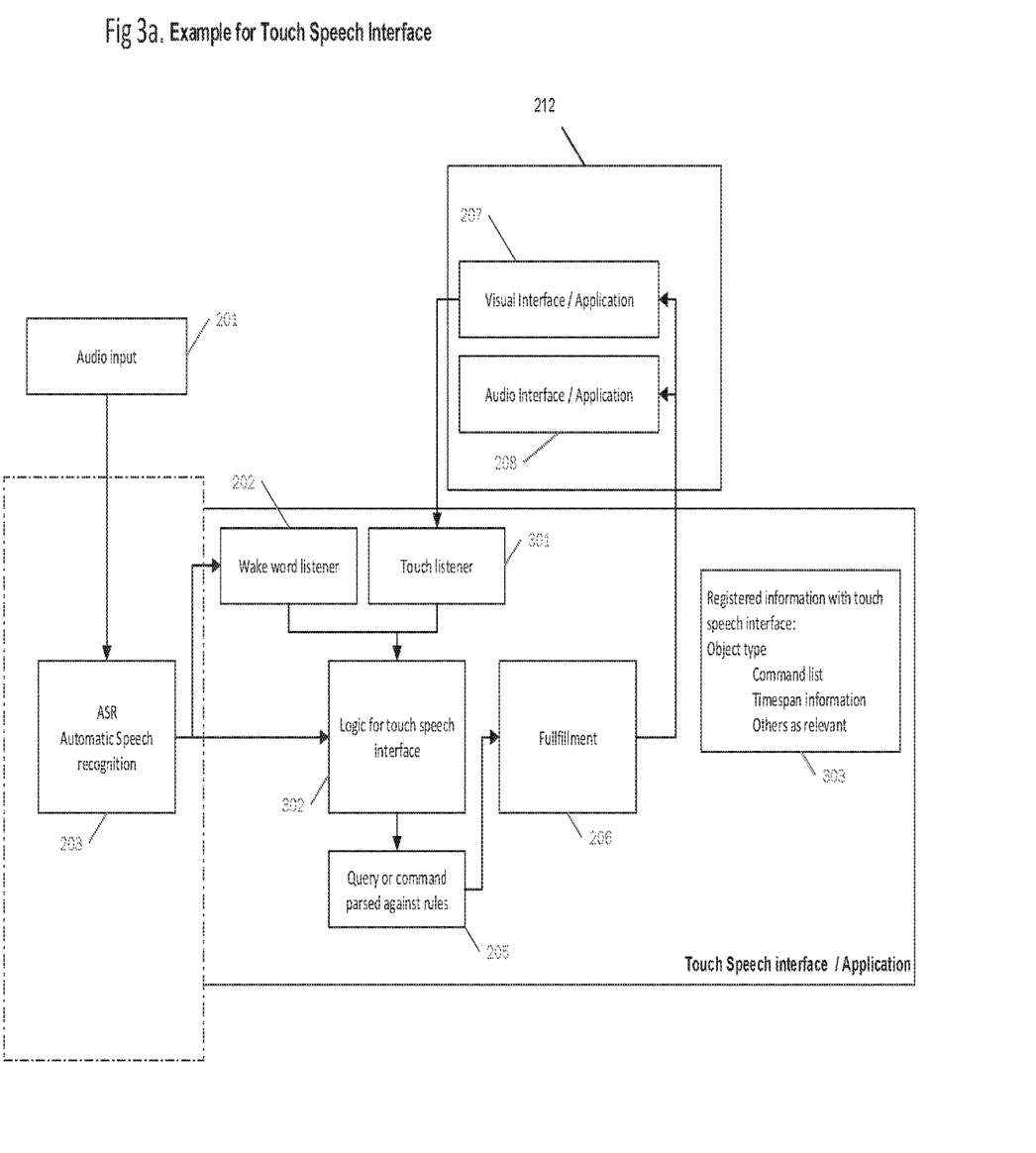
FIGS. 3a and 3b are diagrammatic illustrations of the architecture and functional relationships for a touch speech interface.
Figure 6:
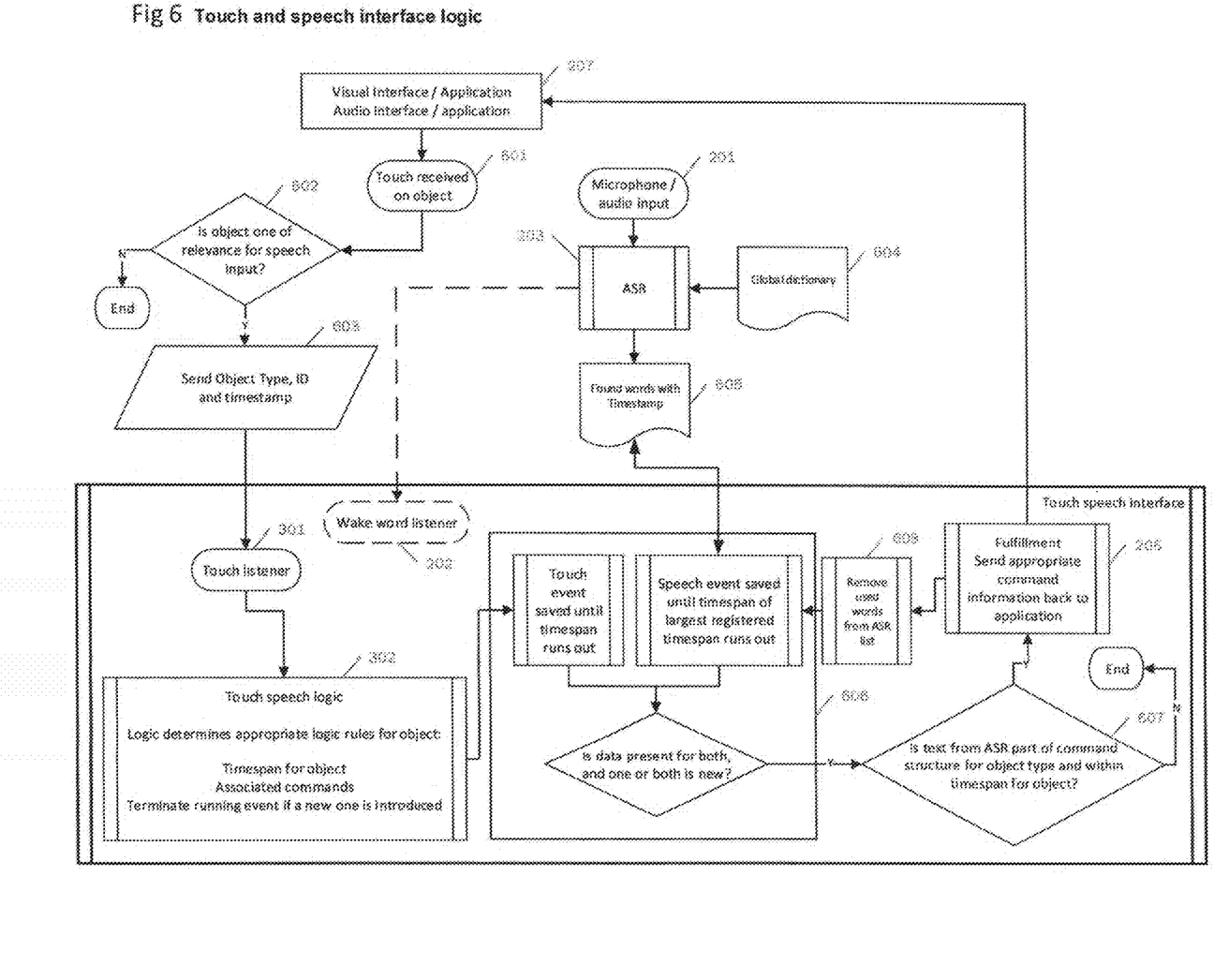
FIG. 6 is a flow chart depicting the logic flow for the touch speech interface for the system.

FIG. 3 a depicts a touch speech interface according to an embodiment of the present invention. The touch speech interface includes elements of a speech interface system with the addition of a touch listener 301, additional logic for the touch speech interface 302, registered information with the touch speech interface 303, and the fact that the ASR 203 is always on. Interface 303 is preferably registered with the touch-speech application by an application program 212. This registered information is preferably used by the logic element of the application 302 to make determinations for command words. There is also a tie in with the "Global Dictionary" as it is a compilation of all commands for registered objects. FIG. 6 speaks to the use in the description. The wake word listener 202 is still possible to use, but it is now a trigger or input for the logic of the touch speech interface 302 to start to parse the found words from the ASR 203.

Figure 3B:
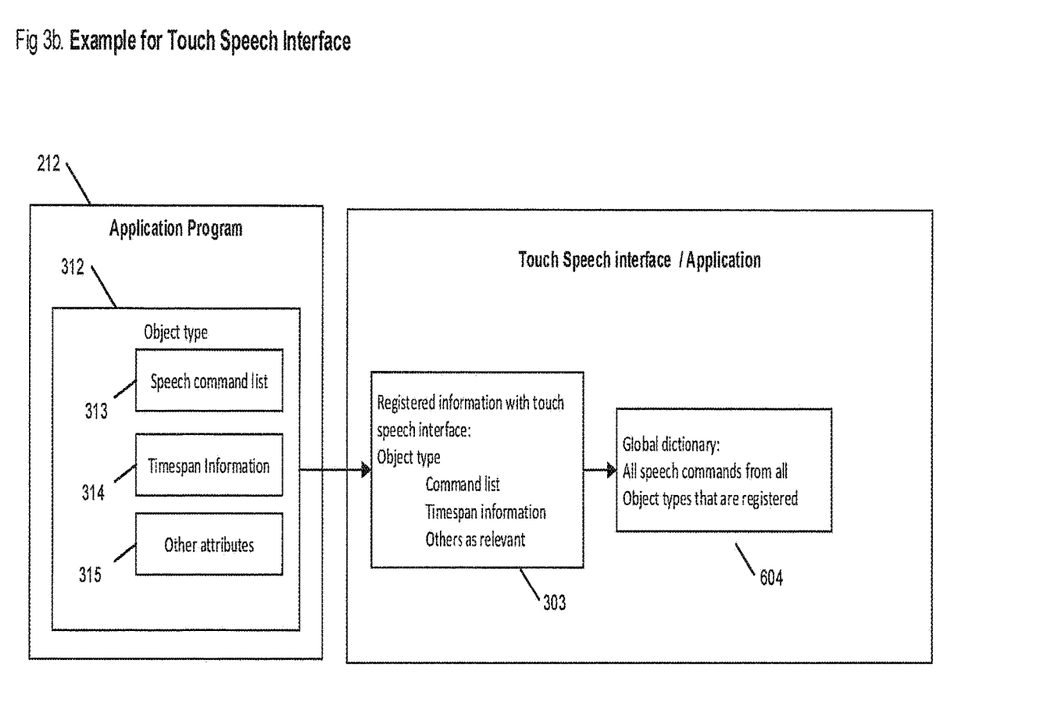

FIG. 3 b also depicts the information that is registered 303 with the touch speech interface. Application programs 212 preferably register one or more object types 312 that are to be associated with touch speech events. Each object type will preferably have a speech command list 313 comprising one or more commands, timespan information 314 for the object type which comprises time before a touch, a potential delay after touch, and a time after a touch event, and other attributes 315 as required. The touch speech interface preferably creates a global dictionary 604 from all the unique speech commands which will be used by the logic of the touch speech interface for potential touch speech matches. Alternatively, the application program 212 may create and register the global dictionary 604 instead of it being created by the touch speech interface.

Figure 4:
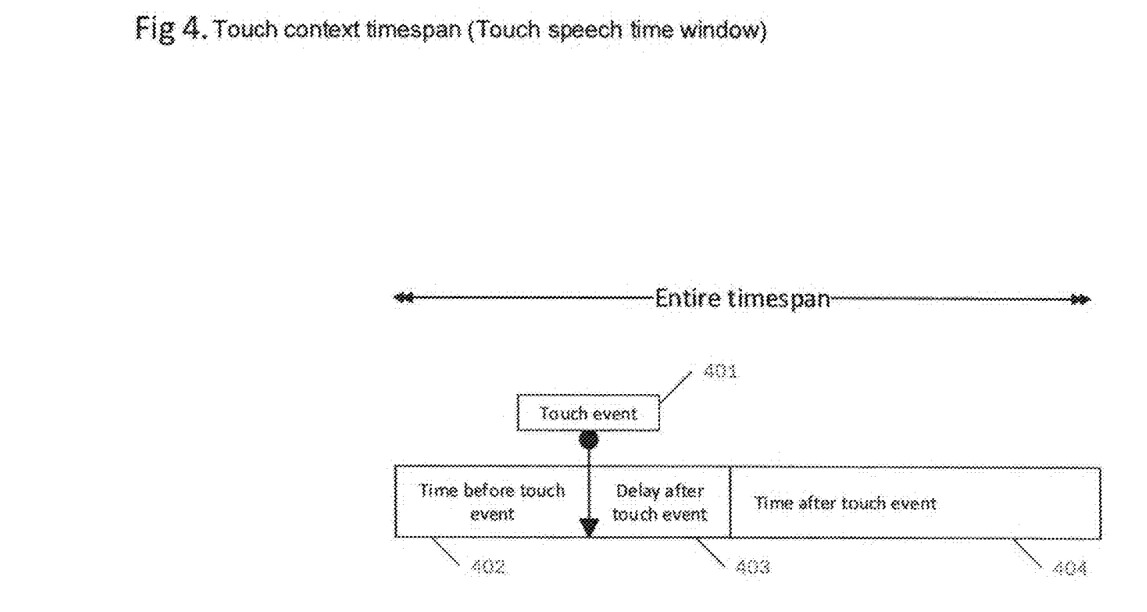
FIG. 4 is a diagrammatic illustration of the timespan context for an object (touch speech time window).

FIG. 4 depicts the elements of the timespan that is part of the context for a touch event 401, also referred to as the touch speech time window, on an object that would be sent to the touch speech interface 302. The timespan is made up of three elements, the amount of time before a touch event 402, a potential delay after the touch event 403, and the time after the touch event 404. This overall time span is used by the logic of the touch speech interface 302, which then attempts to match words that the ASR 203 has found from the incoming audio input 201 to a list of associated commands. The timespan itself could be registered as a global timespan for the application, or could be unique timespans registered for individual object types or it could be additional timespan logic for individual touch context events that is sent to the touch speech interface.

Figure 5A:
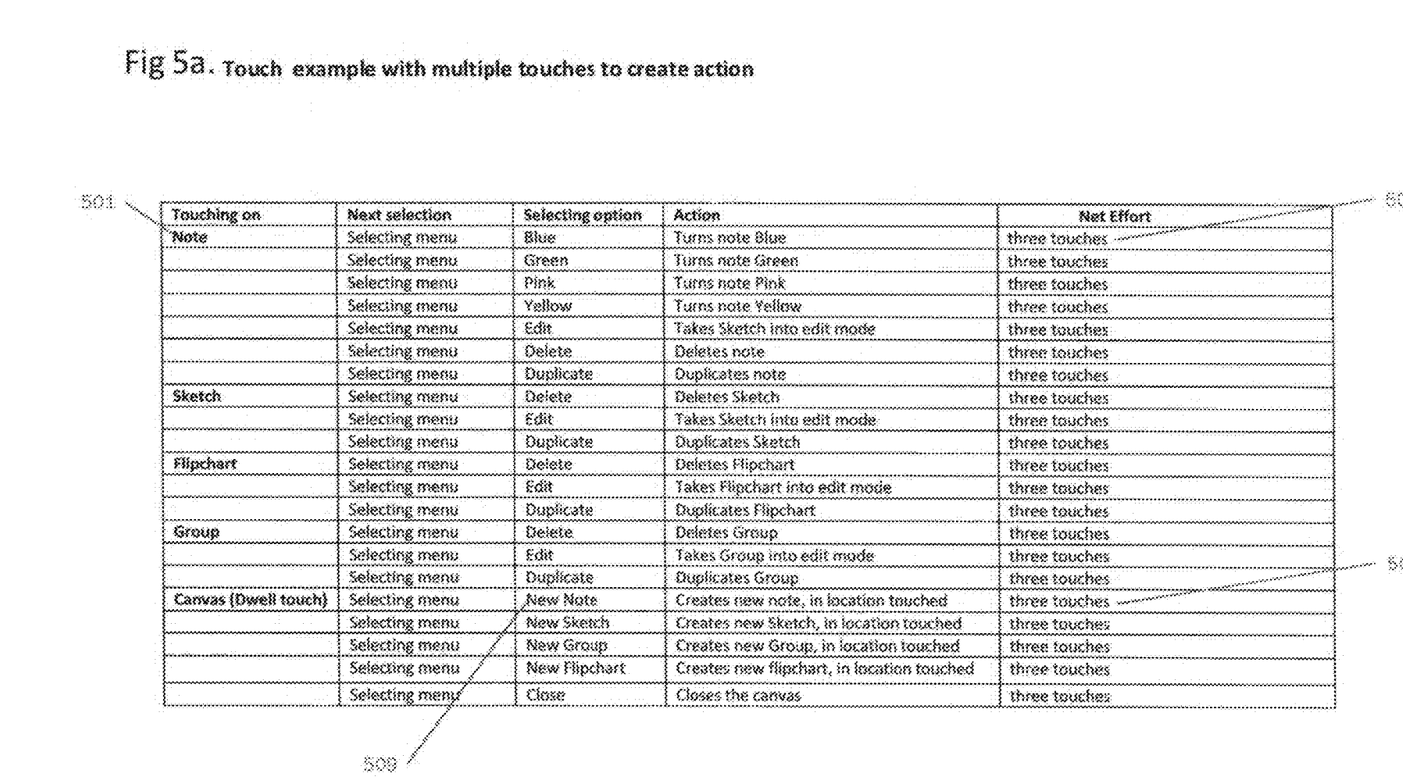
Figure 5B:
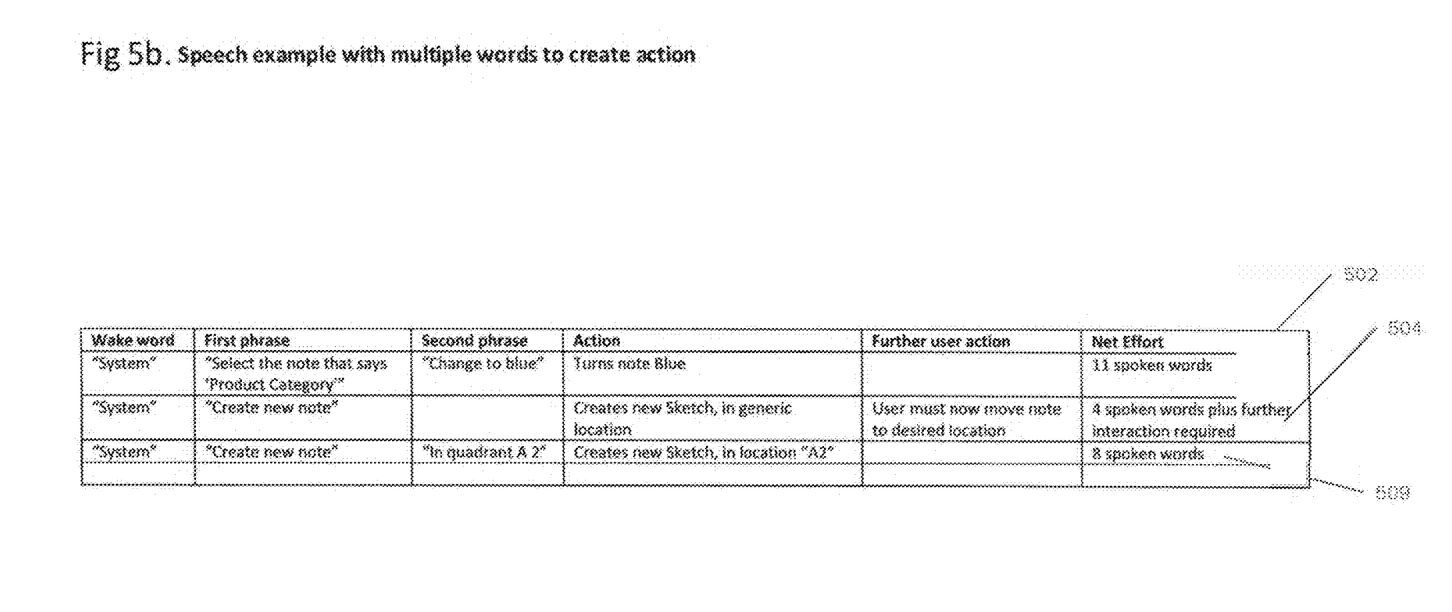

FIGS. 5a, 5b, and 5c compare the different interaction styles: touch only (FIG. 5a), speech only (FIG. 5b), and touch speech (FIG. 5c). These different interaction types depict the number of steps or actions that a user 109 must perform to have a system action taken. For the example of changing the color of a note 501, for touch only interaction there are three touches required (Touch note, select menu then select option) 506. For speech only interaction there are 11 spoken words required ("System, Select the note that says product category", "change to blue") 502. For the touch speech interaction style, there is one touch and one spoken word (touch note, say "Blue") 503. This demonstrates that the hybrid interaction style is more efficient than the single interaction styles. For the example of creating a new note 509, for touch only interaction, there are three touches required (One dwell on the background, select menu, select new note) 505. And the creation of the note would be where the menu touch was or in close proximity to it. For the speech only interaction, there are 4 spoken words plus a further interaction to place the note where the user wants it ("System, create a new note", then move new note to desired location as it will be created in a generic spot when the desired location is unknown) 504; or it will have 8 spoken words to also tell the system where to create the note ("System, create new note in quadrant A 2") 509. For text speech interaction, there is one touch event and two words (Touch on background, say "New note") 508. The system knows where to put the new note as the context for it comes from the initiating touch location. FIG. 5c also depicts, but is not limited to, the object types and the associated commands 507 that they have.

Each object or aspect of the graphical user interface 111 that is touched has a context associated with it. If the object (context) is one that is known to have speech commands associated with it, then the application program 212 can provide the context to the logic of the touch speech interface 302. This context is made up of multiple elements. The elements that the present invention include, but is not limited to, the type of object selected (Background 105, note 106, sketch 107, group 113 (as shown in FIG. 1a), button etc.), a touch object ID number to identify it, and the time that the touch event occurred. Other elements include, but are not limited to, the X,Y location 112 (as illustrated in FIG. 1b) on the graphical user interface 111 where the touch occurred, unique timespan information, touch pressure, touch ID, unique pen ID, type of interface (Mouse, touchscreen) or type of touch (Single, double, dwell). A "touch" in this specification may include, but is not limited to, one or more of, or any combination of touch devices(s) used to create a touch event on an interactive display such as, stylus, human hand and all parts of the hand and fingers, laser pointers, infrared pointers, mice, gesture detection, motion detection, ultrasonic, capacitive, keyboard, Wi-Fi enabled, and/or any touch device capable of sending/receiving touch events and messages to/from a local area network or a wide area network (e.g., the Internet), such as devices embedded in cars, trucks, aircraft, household appliances (refrigerators, stoves, thermostats, lights, electrical control circuits, the Internet of Things, etc.).

Application programs 212 that would utilize the touch and speech interface need to register the required information 303 with the logic of the speech interface. This can be done when the application is installed or at initialization of the application. The elements that need to be registered with the touch speech interface relate to the graphical user interface elements (For example objects) that have speech commands associated with them. The object types 105, 106, 107, 113 should be registered along with their associated command words 507 and touch speech time spans to use 402, 403, 404 for the potential match of a touch event and speech command. The associated command words 507 need to be registered in advance of use to enable the system to recognize a command before a touch event, but the time span in which to look for a match may be registered in advance or sent at the time of a touch event. Other relevant information may also be registered with the touch speech interface such as touch pressure logic, unique pen ID logic, type of touch logic or other aspects that the touch system might be able to provide. The present invention describes a minimal set of touch logic, but is not limited to it.

FIG. 6 is a logic flow map depicting how the touch to speech interface works with application programs, according to an embodiment of the subject invention. According to the present invention, the ASR 203 is preferably always running and determining if there are speech words that are a match to the words of a global dictionary 604. This global dictionary 604 preferably is a language agnostic list of all the potential words or phrases that the system might use, which preferably is an accumulation of all the individual object types associated commands 507 that have been registered 303 with the touch speech interface. Each object type's commands could be thought of as a dictionary for the object type and the global dictionary 604 is made up of all unique commands from all dictionaries. With the ASR 203 always running, there is no need to have a "Wake word" to invoke the ASR 203. The ASR 203 has a constant input from the microphone/audio input 201. This permanent "on" state makes the system more efficient with speech commands as it is always capturing and processing speech and the user does not need to wait for it to initialize. The ASR 203 attempts to match speech input to the global dictionary 604 and creates a list of recognized words or phrases along with a timestamp 605 of when they were heard. This permanent "on" state affords the ability to match a touch event with a speech event that occurs before 402, during or after the touch event 403, 404.

The logic of the speech interface receives an input from an application program 212 based on a touch event 601 that has a speech event associated with it 602. This event triggers the touch listener 301 to activate the logic for the touch speech interface 302. The touch speech logic takes the timestamp of the object type and ID touch event 603 and places the touch event in 609 waiting to be fulfilled. The touch speech logic then looks for a match with an associated command 507 from the words that the ASR 203 found 605 and are in 610 waiting to be fulfilled, 606. If the timespan logic for the object matches a command that is within the correct timespan then it is a touch speech match 611, 607. When a match is found, the fulfillment component 206 then sends the ID (Of the object type and touch event) back to the application program 212 along with the associated command that was matched 507. The associated command can be the command itself or an encoded representation. It is important to note that the timespan for an object can be from a defined time before the touch event 402 to a defined time after the touch event 403, 404. As an example, the timespan could be 0.5 seconds before the touch event to 1 second after it or only time before 402 or only time after or a delay 403 after the touch event for a defined time 404 or any combination of timespans. Preferably, the timespan will include pre-touch span, a delay, and a post-touch span. Preferably, the pre-touch span may range from 0.0 second 4.0 seconds before touch; more preferably from 0.0 second to 3.5 seconds before touch; even more preferably from 0.0 second to 3.0 seconds before touch; even more preferably from 0.0 second to 2.5 seconds before touch; even more preferably from 0.0 second to 2.0 seconds before touch; even more preferably from 0.0 second to 1.5 seconds before touch; even more preferably from 0.0 second to 1.0 seconds before touch; and most preferably 0.5 seconds before touch. Preferably, the delay time span may be from 0.0 seconds to 4.0 seconds; more preferably 0.5 to 3.5 seconds; even more preferably 1.0 to 3.0 seconds; even more preferably 1.5 to 2.5 seconds; even more preferably 2.0 seconds. Preferably, the post touch timespan ranges from 0.0 second to 5.0 seconds after touch; more preferably 0.5 second to 4.5 seconds; even more preferably 1.0 second to 4.0 seconds; even more preferably 1.5 second to 3.5 seconds; even more preferably 2.0 second to 3.0 seconds; even more preferably 2.5 seconds. Of course, any combination or these ranges is within the spirit and scope of the present invention.

The range of time before a touch event 402 is set based on the amount of time that a user will reasonably take to select an object. A user might decide to change the color attribute of an object, issue the verbal command "Red" and then take time to determine which specific object to touch and then touch it. Some object types may require more thought than others before a selection is made. Simple commands are typically in the order of 1-1.5 seconds where some commands may need a window of up to 5 seconds. The appropriate window of time depends on the application and the complexity for the user. It is important to note that the speech command must be processed by the ASR before it is sent to the touch speech logic and as such does not consume part of the time 402.

The range of time after a touch event, both 403 and 404 combined, is set based on the amount of time it takes a user to decide what command to issue and the time it takes for the command to be spoken and processed by the ASR. If a user wants to change the color attribute of an object and they then touch the object, they then need to decide what color to change it to. The color command is determined by the user and is then spoken. In this case the user spoke "Marigold yellow." The speech is processed by the ASR and then provided to the touch speech logic. If the command is issued within the time span of 403 and 404 then it is a match. The delay after touch timespan 403 can be altered by the logic of the touch speech interface to include an amount of time that encapsulates the most complex command for that object type to be processed by the ASR. This would allow more flexibility for the system to dynamically compensate the timespan based on spoken work complexity. Preferably, the delay timespan of 0-4 seconds plus the post touch time span of 0-5 seconds will yield 0-9 seconds.

The actual use of the timespan for 402, 403 and 404 also includes an overlap based on how users interact with the system. An example would be a user speaking a command such as "Create new note" and then touches an object such as the background 105 before the speech has been processed by the ASR and sent to the touch speech logic. In this case the speech of the user is before the touch event, but for the touch speech logic the speech event would actually occur after the touch event. It would still be satisfied as a match as it falls within the timespan after the touch 403, 404.

If the touch speech interface receives an input 603 from an application program 212 and attempts to find a match within the timespan for the context of the object 607 but then receives a new input from the application program 603, before the timespan of the first input has elapsed 403, 404, the first input is discarded from 609 and the second input is used for a potential new match. Discarding the first event prevents accidental use if the user selects an object and then selects another object and then speaks a command, all within the timespan of the first object selected.

If the touch speech interface receives an input 605 from the ASR and places it into 610, waiting to be fulfilled, and a new input is received before the timespan of the speech event has lapsed 402 then the initial input is discarded and the new one is used to look for a touch speech match. It is important to note that the timespan for a command 402 could differ from object type to object type and a command that is common for different object types that has different timespans 402 then the longest timespan will be used to determine how long to keep the command. This allows a user to change the command before they select an object and have the second command be used instead of the first, "Red, no Blue". The logic 610 and 607 will still use the specific touch object context for the object type timespan when a potential match is found to determine if it should be validated.

When the touch speech interface logic 302 finds a match from the list of words that the ASR 203 has found, it removes the found words from the list 610, 608. This is to avoid a double use of the found words. If two input events are triggered close enough together such that the timespan after touch 404 of the first event overlaps with the timespan before touch 402 of the second input it is possible that the second input could match the command that was intended for the first input. Removing the found word prevents this accidental usage.

The touch speech interface logic attempts to find a match of commands, for the defined timespan of the object, from the list of commands that the automatic speech recognition has created 606 (609, 610, 611), 607, and immediately acts on a match even if the timespan for the match has not completely elapsed 607. This allows the system to react faster than waiting for the entire timespan to lapse for every touch object sent to the touch speech interface.

The present invention does not cover in detail the use of the wake word listener 202 in context of the touch speech interface. The touch speech interface can still utilize the wake word listener 202 as a trigger, but the trigger is not to turn on the ASR 203, but to activate the logic of the touch speech interface 302. In cases where a trigger comes from the wake word listener 202, only the rules for traditional speech commands are used 204, 205. This allows the system to be used in both modes of speech interface as well as touch speech interface.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Touch and speech input apparatus configured for a user to provide input to (i) a touch sensitive input device which displays a plurality of touch objects of a plurality of touch object types, and which receives touch input from a plurality of different touch interface types, and (ii) a speech input device, wherein each touch object type has a unique speech command for each of the plurality of touch interface types, enabling unique set of touch speech commands for each touch object type, comprising:
    at least one memory storing in a global dictionary a plurality of different touch interface types with corresponding speech commands for each object type; and
    at least one processor configured to:
        receive input from the touch sensitive input device with respect to a touch object;
        determine the touch interface type of the received touch object, and retrieve from the global dictionary a list of speech commands corresponding to both (i) the touch object type of the received touch object and (ii) the touch interface type of the received touch object;
        receive an input from the speech input device;
        determine whether the received input from the speech input device is present in the retrieved list of speech commands; and
        if the received input from the speech input device is present in the retrieved list of speech commands, activate an action corresponding to both (i) the received input from the touch sensitive input device and (ii) the received input from the speech input device.

2. The apparatus of claim 1, wherein the plurality of touch objects includes at least two of: a note, an image, a sketch, a button.

3. The apparatus of claim 1, wherein the plurality of touch object types includes at least two of: background, note, sketch, group, ink strokes.

4. The apparatus of claim 1, wherein the plurality of touch interface types includes at least two of: finger, pen, mouse, laser pointer, infrared device.

5. The apparatus according to claim 1, wherein the at least one processor is configured to perform automatic speech recognition functions.

6. The apparatus according to claim 1, wherein the at least one processor is configured to activate said action based on input of one touch and one spoken word.

7. The apparatus according to claim 1, wherein the at least one processor is also used to receive a wake word input.

8. Touch and speech input method for a user to provide input to (i) a touch sensitive input device which displays a plurality of touch objects of a plurality of touch object types, and which receives touch input from a plurality of different touch interface types, and (ii) a speech input device, wherein each touch object type has a unique set of speech commands for each of the plurality of touch interface types, enabling unique touch speech commands for each touch object type, comprising:

storing a global dictionary in at least one memory, the global dictionary comprising a plurality of different touch interface types with corresponding speech commands for each object type; and using at least one processor to:
receive input from the touch sensitive input device with respect to a touch object;
determine the touch interface type of the received touch object, and retrieve from the global dictionary a list of speech commands corresponding to both (i) the touch object type of the received touch object and (ii) the touch interface type of the received touch object;
receive an input from the speech input device;
determine whether the received input from the speech input device is present in the retrieved list of speech commands; and
if the received input from the speech input device is present in the retrieved list of speech commands, activate an action corresponding to both (i) the received input from the touch sensitive input device and (ii) the received input from the speech input device.

9. The method of claim 8, wherein the plurality of touch objects includes at least two of: a note, an image, a sketch, a button, ink strokes.

10. The method of claim 8, wherein the plurality of touch object types includes at least two of: background, note, sketch, group.

11. The method of claim 8, wherein the plurality of touch interface types includes at least two of: finger, pen, mouse, laser pointer, infrared device.

12. The method of claim 8, wherein the at least one processor performs automatic speech recognition functions.

13. The method of claim 8, wherein the at least one processor activates said action based on input of one touch and one spoken word.

14. The method of claim 8, wherein the at least one processor is also used to receive a wake word input.

15. Program code embodied in a non-transitory computer readable medium for a user to provide input to (i) a touch sensitive input device which displays a plurality of touch objects of a plurality of touch object types, and which receives touch input from a plurality of different touch interface types, and (ii) a speech input device, wherein each touch object type has a unique speech command for each of the plurality of touch interface types, enabling a unique set of touch speech commands for each touch object type, said program code comprising instructions causing at least one processor to:

store a global dictionary in at least one memory, the global dictionary comprising a plurality of different touch interface types with corresponding speech commands for each object type;
receive input from the touch sensitive input device with respect to a touch object;
determine the touch interface type of the received touch object, and retrieve from the global dictionary a list of speech commands corresponding to both (i) the touch object type of the received touch object and (ii) the touch interface type of the received touch object;
receive an input from the speech input device;
determine whether the received input from the speech input device is present in the retrieved list of speech commands; and
if the received input from the speech input device is present in the retrieved list of speech commands, activate an action corresponding to both (i) the received input from the touch sensitive input device and (ii) the received input from the speech input device.

16. The program code of claim 15, wherein the plurality of touch objects includes at least two of: a note, an image, a sketch, a button, ink strokes.

17. The program code of claim 15, wherein the plurality of touch object types includes at least two of: background, note, sketch, group.

18. The program code of claim 15, wherein the plurality of touch interface types includes at least two of: finger, pen, mouse, laser pointer, infrared device.

19. The program code of claim 15, wherein said program code comprises instructions causing the at least one processor to perform automatic speech recognition functions.

* * * * *